Oct. 22, 1940. W. G. CALKINS ET AL 2,218,809
POROUS METAL FORMING APPARATUS
Filed March 3, 1938
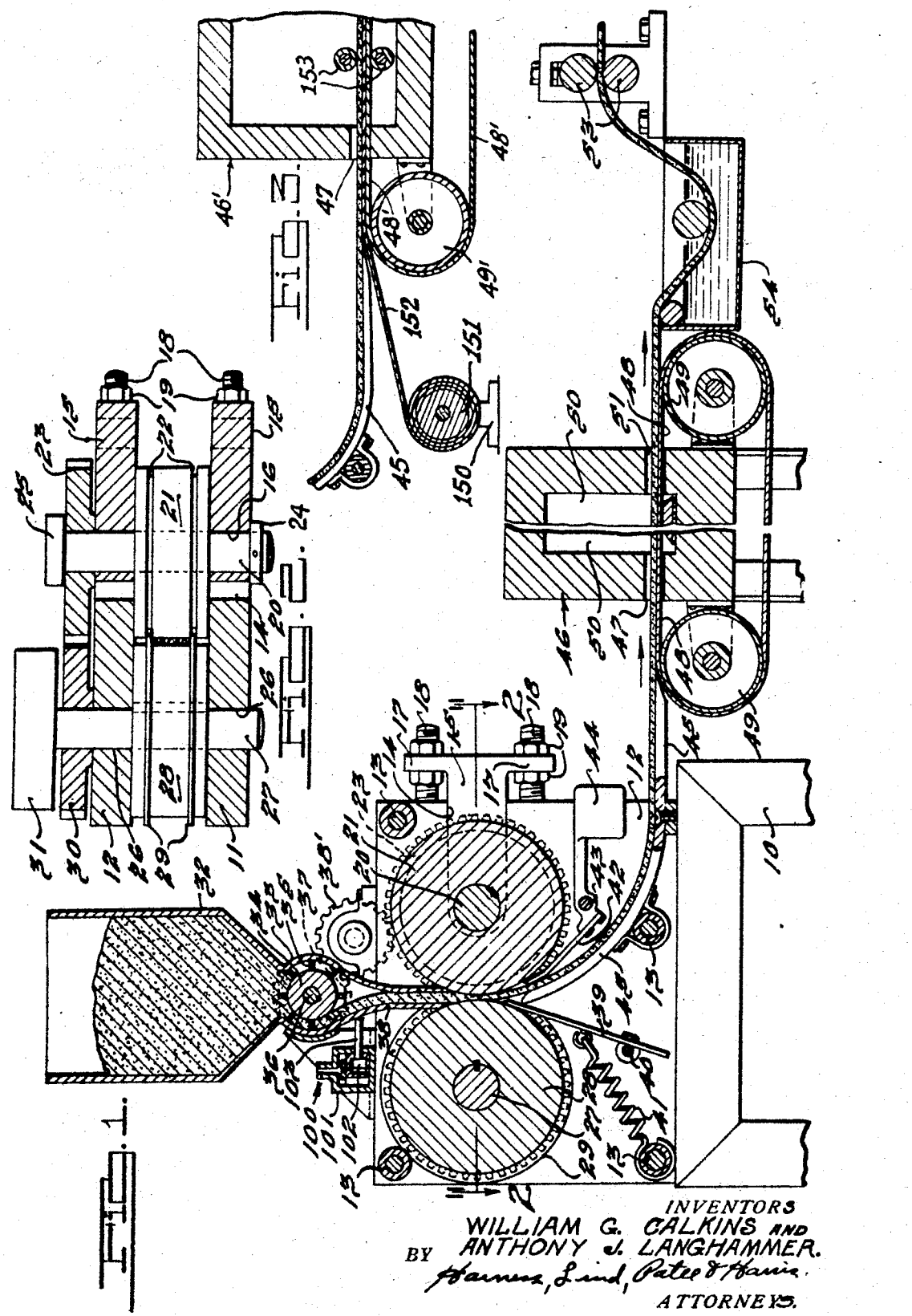
INVENTORS
WILLIAM G. CALKINS AND
ANTHONY J. LANGHAMMER.
ATTORNEYS.

Patented Oct. 22, 1940

2,218,809

UNITED STATES PATENT OFFICE 2,218,809

POROUS METAL FORMING APPARATUS

William G. Calkins and Anthony J. Langhammer, Detroit, Mich., assignors to Chrysler Corporation, Highland Park, Mich., a corporation of Delaware Application March 3, 1938, Serial No. 193,700

3 Claims. (Cl. 266—1)

This invention relates to improved apparatus for manufacturing bearings and is a continuation in part of our copending application, Serial Number 77,324, filed May 1, 1936, renewed May 17, 1939, now Patent No. 2,178,529, issued Oct. 31, 1939.

More particularly, the invention pertains to improvements in apparatus for manufacturing bearings having porous metal bearing surfaces of the character which have a substantial lubricant absorbing capacity.

One of the main objects of the invention is to provide apparatus of this character for producing bearing material in the form of sheet-stock which may be employed in its flat shape or readily formed to a desired contour.

A further object of the invention is to provide apparatus of this kind which produces porous metal bearing stock of sheet-like form that is sufficiently flexible in its unsintered state to accommodate substantial flexure during production and subsequent handling without fracture.

A still further object of the invention is to provide apparatus of this character by which can be produced sintered sheet-like bearing material that may be deformed to a comparatively large variety of shapes and which is sufficiently flexible to withstand repeated flexure without failure.

An additional object of the invention is the provision of bearing material forming apparatus by which compressed, powdered metal stock may be simultaneously sintered and bonded to a reinforcing backing.

A further object of the invention is to provide improved apparatus for manufacturing sheet-like porous metal bearing material in a continuous process and by which comparatively long strips of such material can be made in a continuous manner.

Other objects of the invention are to provide improved apparatus for making sheet-like porous metal bearing materials; to provide means and apparatus of this character for compressing and forming finely divided powdered porous metal constituents into a continuous ribbon of uniform thickness; to provide improved means for feeding measured quantities of such mixtures of powdered constituents to the compressing apparatus at a rate proportional to the speed of operation of the latter so as to maintain uniform density and porosity as well as thickness.

A still further object of the invention is to provide improved apparatus for continuously applying elongated strips of sheet-like porous metal bearing material to correspondingly elongated strips of reinforcing backing metal.

An illustrative embodiment of the invention is shown in the accompanying drawing, in which:

Fig. 1 is a fragmentary, interrupted elevational view showing porous metal forming apparatus embodying the invention, partly in section and with parts removed to disclose the underlying structure.

Fig. 2 is a horizontal sectional view taken on the line 2—2 of Fig. 1.

Fig. 3 is a fragmentary, vertical, sectional view of an apparatus embodying a further development of the invention by which compressed, powdered metals may be simultaneously sintered and bonded to a sheet metal backing.

In the form of the invention illustrated in the drawing, our improved porous metal forming apparatus includes a support 10 on which is mounted a frame structure comprising spaced side members 11 and 12 which are secured together and held in fixed, spaced relation by transverse bars 13. Each side member 11 and 12 is provided with a slot 14 extending inwardly from its right vertical edge, as viewed in Fig. 1, in which is slidably mounted a block 15 having a bore 16 formed in its inner end. Each block 15 has outwardly extending flanges 17 on its external end provided with apertures through which extend threaded studs 18, rigidly mounted in the frame side members 11 and 12, respectively. Threaded on each stud 18 is a pair of nuts 19 between which the flanges 17 of the block 15 are disposed. The nuts 19 may be adjusted to selectively position the blocks 15 in their respective slots 14 and to maintain the blocks against unintended movement.

Journalled in the bores 16 of the slidable blocks 15 is a shaft 20 which extends transversely of the frame structure and on the intermediate portion of which is rigidly mounted a roller 21 having spaced grooves 22 formed in its periphery. A gear 23 is also fixed to the shaft 20 and disposed adjacent the side member 12 of the frame structure. The shaft 20 is held against axial movement relative to the slide blocks 15 by collars 24 and 25 which are fixed on its respectively opposite ends and disposed externally of the frame structure, the collar 24 being located adjacent the slide block 15 of one side frame member and the collar 25 being disposed adjacent the gear 23.

The side members 11 and 12 of the frame member are provided with registering bores 26 in which is journalled a transversely extending shaft 27 having a roller 28 fixed on its intermediate portion and disposed between the sides 11 and 12 of the frame. The roller 28 has external ribs 29 on its periphery which fit into the grooves 22 of the roller 21 in order to provide a passage between the peripheries of the rollers 21 and 28 having sharply defined edge extremities. Fixed on the shaft 27 is a gear 30 having teeth thereon meshed with the teeth of the gear 23. One end of the shaft 27 is provided with a driving member, diagrammatically illustrated at 31, which may comprise a gear, pulley or other suitable means by which the shaft 27 and roller 28 thereon may be rotated by a suitable motor or other prime mover. The peripheries of the rollers 21 and 28 may be adjustably positioned with respect to each other by manipulation of the nuts 19 on the threaded stems 18 which are adapted to shift the slidable blocks 15 inwardly and outwardly with respect to the slots of the side members 11 and 12 of the frame in order to bring the peripheries of the rollers 21 and 28 closer together or further apart as desired. In this manner, the thickness of the article compressed between the rollers may be conveniently predetermined. The diameters of the rolls 21 and 28, as well as their spaced relationship, are preferably predetermined to facilitate the formation of briquettes of different thicknesses. It is found that more satisfactory results are obtained by reducing the diameter of the rolls as the thickness of the strip formed therebetween is decreased, and increasing the diameters of the rolls as the thickness of such strip is increased.

Mounted on the frame structure of the porous metal forming apparatus shown in Fig. 1 is a hopper 32 having an intermediate portion 33 of somewhat cylindrical cross-section in which is mounted a dispensing device 34 having radially extending vanes 35. The dispensing device 34 is keyed on a shaft 36 journalled in the side walls of the intermediate portion 33 of the hopper and this shaft is drivingly connected by gears 37 and 38' with the gear 23 by which the roller 21 is driven in timed relation with respect to the roller 28 and gear 30. During operation of the rollers the dispensing device 34 is rotated in timed relationship therewith so as to discharge measured quantities of the contents of the hopper from the latter at a rate proportional to the speed of operation of the rollers. The hopper 32 has a downwardly extending tapered discharge spout 38 which is adapted to direct the material discharged from the hopper into the space between the rollers 21 and 28 and between the ribs 29 of the roller 28. Mounted on the frame structure of the forming apparatus is a vibrator, generally designated by the numeral 100 in Fig. 1, by which the discharge spout 38 and walls of the hopper 32 can be vibrated to feed powdered material to the rolls. This vibrator includes an air cylinder 101, piston 102, and piston rod 103 engaging the discharge spout 38 and suitable valve mechanism (not shown) by which vibratory movement of the piston is controlled. A scraper 39 is pivotally mounted at 40 on the side member 12 of the frame structure and is provided at its upper end with a knife edge which is yieldingly held in contact with the periphery of the roller 28 by a coil spring 41 as illustrated in Fig. 1.

A similar scraper 42 is pivotally mounted at 43 on the side member 12 of the frame structure and yieldably held in contact with the periphery of the roller 21, and particularly the portion thereof between the grooves 22 of the roller 21 by a counterweight 44 which normally tends to rotate the scraper 42 in a clockwise direction as viewed in Fig. 1.

Disposed between the scrapers 39 and 42 is a support 45 having an arcuately curved end portion projecting to within close proximity of the peripheries of the rollers 21 and 28 which is adapted to receive the ribbon of sheet-like porous bearing material compressed between the rollers 21 and 28 and to guide the movement thereof in a curvilinear course of relatively large curvature as the compressed ribbon is discharged from the pressure-applying apparatus. The opposite end portion of the support 45 is substantially horizontal and it is constructed and arranged to direct the ribbon of compressed constituents of the porous metal toward the inlet end of a furnace 46, hereinafter more specifically described.

Any desired combination of constituents of porous metals may be placed in the hopper 32 and fed therefrom by the dispensing apparatus 34 to the rollers 21 and 28 by which the material, which is usually in a very finely divided state, is compressed to the form of a sheet-like briquette of any desired thickness, the length of the briquette being determined by the amount of the powdered mixture supplied to the hopper 32 and the thickness thereof being predetermined by the size and adjustment of the rollers 21 and 28 in the foregoing manner.

The terminology "bearing material" and "porous bearing metal" appearing in the specification and claims is used in its broad sense and should be construed to include frictional, such as that employed in lining brakes and clutches, as well as anti-frictional materials. In many frictional applications, porous metal formed from powdered mixtures of the foregoing compositions are satisfactory, particularly when the lubricant impregnating operation is omitted.

The furnace 46 is disposed adjacent the discharge end of the support 45 and it has an inlet opening 47 which registers with the latter. Disposed in substantial alignment with the upper surface of the support 45 is a conveyor belt 48 which is movably supported on spaced rollers 49 mounted on the opposite ends of the furnace 46. The upper side of the conveyor 48 extends through the interior 50 of the furnace 46 and through an outlet opening 51 which registers with the inlet opening 47. As the continuous sheet-like briquette leaves the discharge end of the support 45, it is deposited upon the belt 48 of the conveyor by which it is gradually drawn through the interior of the furnace 46 which preferably has a non-oxidizing or reducing atmosphere. A suitable atmosphere may be provided by supplying either hydrogen or illuminating gas of a reducing character to the interior of the furnace. The furnace is preferably maintained at a temperature slightly above the melting point of one of the powdered metal constituents of the mixture of which the briquette is formed and below the melting point of the other metal. If more than two metals are employed in the mixture then the sintering temperature may be above the melting point of two of the metal constituents thereof but below the melting point of the other. The particular temperature is, of course, predetermined by the character of the constituent of the powdered mixture of which the briquette is formed. The conveyor belt 48 is preferably driven by driving mechanism (not shown) which may be operatively connected with one of the pulleys 49.

After the ribbon-like briquette has been sintered, it may be deflected while unsupported, as illustrated in the lower portion of Fig. 1 in order to submerge it in an oil bath 54 so as to impregnate the porous metal structure with a suitable lubricant. This lubricant impregnating step may, if desired, be omitted completely or delayed until after the bearing material has been made up into final form.

After the lubricant impregnating operation or, in the event this step is not employed, after the sintering operation, the ribbon-like strip is passed continuously through a pair of sizing rolls 53 by which it may be brought to a desired thickness for use in applications where slight variations in thickness are not permissible.

The sintered ribbon of porous metal may then be wound into a roll upon a reel (not shown), or cut into desired lengths for future use. The sheet-like porous metal may be used, in some applications, in its relatively flat state or it may be formed to any desired curvilinear contour and employed for bearing surface purposes.

In Fig. 3 of the drawing is illustrated a modified form of the apparatus by which a ribbon-like discharge of compressed, powdered metals may be simultaneously bonded to a sheet-metal backing and sintered in a continuous operation. This apparatus includes a furnace 46' similar to the furnace 46 shown in Fig. 1 and having a continuous belt conveyor 48' of which one length travels through the furnace. A support 150 is provided adjacent the inlet end of the furnace on which is mounted a reel 151 of sheet-metal backing material 152 from which a layer of sheet-metal backing material is fed at a location immediately adjacent the discharge end of the support 45 which is shown in Fig. 2 to be associated with the rolls 21. The ribbon of compressed, powdered metals formed by the rolls 21 is deposited in superimposed relation upon the sheet-metal backing 152 as it leaves the right end of the support 45, as viewed in Fig. 3. The superimposed ribbon of compressed metal powder and backing 152 is fed into the inlet 47' of the furnace 46' while supported upon the conveyor 48' and passed between a pair of pressure rolls 153 mounted in the interior of the furnace 46'. If desired, the conveyor 48' may be omitted and the rollers 153 may be driven in any suitable manner so as to feed the superimposed layers of backing and compressed powdered metal through the furnace. There may be as many pairs of pressure rolls 153 in the furnace as desired. During passage of the backing and ribbon of compressed powdered metals through the furnace 46' the powdered metal ribbon is simultaneously sintered and bonded to the sheet-metal backing, the temperature in the furnace being maintained at a suitable sintering and bonding temperature as, for example, 1500° F. to 1550° F. This temperature may be predetermined in accordance with the character of the composition of the powdered metal which is employed.

When the sintered and bonded assembly is discharged from the discharge end of the furnace 46' it may be introduced into an oil bath, or other suitable lubricant, in order to impregnate the porous metal layer therewith.

Although but several specific embodiments of the invention are herein shown and described, it will be understood that various changes in the size, shape and arrangement of parts may be made without departing from the spirit of the invention.

We claim:

1. Apparatus for making sheet porous metal in a continuous strip including a pair of horizontally disposed laterally spaced pressure rolls, means disposed above the space between said rolls for feeding a mixture of powdered constituents of said porous metal vertically downwardly directly between said rolls, said means including a hopper adapted to supply to said space a charge of said mixture of greater thickness than the width of said space, mechanism for drivingly rotating said rolls to compress said mixture uniformly from respectively opposite sides to a thickness smaller than that of said charge, a sintering furnace located in close proximity to said rolls having an inlet end facing the latter, and means for continuously feeding integrally connected successively adjacent portions of said compressed mixture in ribbon-like formation from the discharge side of said rolls to and through said furnace.

2. Apparatus for making sheet porous metal in a continuous strip including a pair of horizontally disposed laterally spaced pressure rolls, means disposed above the space between said rolls for feeding a mixture of powered constituents of said porous metal vertically downwardly directly between said rolls, said means including a hopper adapted to supply to said space a charge of said mixture of greater thickness than the width of said space, mechanism for drivingly rotating said rolls to compress said mixture uniformly from respectively opposite sides to a thickness smaller than that of said charge, a sintering furnace located in close proximity to said rolls having a horizontally disposed passage therethrough provided with an inlet end facing said rolls, means for supporting the compressed mixture discharged by said rolls and guiding the movement of the latter in a curvilinear course from its vertical path of movement through said rolls to a horizontal path aligned with said furnace inlet, and means for continuously feeding horizontally integrally connected successively adjacent portions of said compressed mixture in ribbon-like formation from said supporting means to and through said furnace passage.

3. Apparatus for making a reinforced sheet porous metal and solid sheet metal assembly in a continuous strip including a pair of horizontally disposed laterally spaced pressure rolls, means disposed above the space between said rolls for feeding a mixture of powdered constituents of said porous metal vertically downwardly between said rolls, said means including a hopper adapted to supply to said space a charge of said mixture of greater thickness than the width of said space, mechanism for drivingly rotating said rolls to compress said mixture uniformly from respectively opposite sides to a thickness smaller than that of said charge, a sintering furnace located in close proximity to said rolls having an inlet end facing the latter, means for continuously feeding and supporting integrally connected successively adjacent portions of said compressed mixture in ribbon-like formation from the discharge of said rolls to and through said furnace, a support for a source of solid sheet metal so located with respect to said latter means as to accommodate continuous feeding of said solid sheet metal through said furnace in superimposed relation with said compressed mixture, and means in said furnace for urging said solid sheet metal and said compressed mixture together during sintering of the latter and bonding thereof to said solid sheet metal.

ANTHONY J. LANGHAMMER.
WILLIAM G. CALKINS.